United States Patent
Mallmann

(10) Patent No.: US 12,379,053 B2
(45) Date of Patent: Aug. 5, 2025

(54) CONNECTING DEVICE FOR A SEALED EXCHANGE OF FLUID BETWEEN TWO COMPONENTS, CONNECTING SYSTEM AND BRAKE SYSTEM

(71) Applicant: ZF Active Safety GmbH, Koblenz (DE)

(72) Inventor: Markus Mallmann, Pfalzfeld (DE)

(73) Assignee: ZF Active Safety GmbH, Kobienz (DE)

( * ) Notice: Subject to any disclaimer, the term of this patent is extended or adjusted under 35 U.S.C. 154(b) by 0 days.

(21) Appl. No.: 17/970,656

(22) Filed: Oct. 21, 2022

(65) Prior Publication Data
US 2023/0127426 A1   Apr. 27, 2023

(30) Foreign Application Priority Data
Oct. 22, 2021   (DE) .......................... 102021127568.7

(51) Int. Cl.
*F16L 17/025*   (2006.01)
*F16L 19/02*   (2006.01)
*F16L 19/065*   (2006.01)

(52) U.S. Cl.
CPC ......... *F16L 19/065* (2013.01); *F16L 19/0206* (2013.01)

(58) Field of Classification Search
CPC ......... F16L 17/025; F16L 5/10; F16L 41/088; F16L 9/006; F16L 15/022; F16L 15/122; F16L 15/127
USPC ........................................................ 285/370
See application file for complete search history.

(56) References Cited

U.S. PATENT DOCUMENTS

| | | | | |
|---|---|---|---|---|
| 3,643,915 A | * | 2/1972 | Wanner ...................... | F16L 5/10 267/64.16 |
| 6,601,852 B1 | * | 8/2003 | Kogler ...................... | F16L 5/10 285/97 |
| 2006/0208480 A1 | * | 9/2006 | Happel ...................... | F16L 5/10 249/83 |
| 2009/0058081 A1 | * | 3/2009 | Martin .................. | F16L 41/088 285/196 |

FOREIGN PATENT DOCUMENTS

| | | | | |
|---|---|---|---|---|
| DE | 29680972 U1 | | 11/1998 | |
| DE | 69909348 T2 | | 5/2004 | |
| DE | 60013517 T2 | | 10/2005 | |
| DE | 202006002174 U1 | * | 8/2006 | ............... F16L 5/10 |
| DE | 102010046383 A1 | | 3/2012 | |

(Continued)

OTHER PUBLICATIONS

DE102018109685A1—Machine Translation—English (Year: 2019).*

*Primary Examiner* — Matthew Troutman
*Assistant Examiner* — Fannie Kee
(74) *Attorney, Agent, or Firm* — Kristin L. Murphy

(57) ABSTRACT

A connecting device for a sealed exchange of fluid between two components is disclosed. The connecting devices comprises a pipe portion with at least two pipe portion ends, wherein an extent of the pipe portion between the pipe portion ends determines a streamline of the fluid, and comprises a sealing element which at least partially surrounds the pipe portion. At least one of the pipe portion ends is configured to form an inflow and/or outflow region that extends over the clear dimension of the at least one pipe portion end.

15 Claims, 2 Drawing Sheets

(56) References Cited

FOREIGN PATENT DOCUMENTS

| DE | 102018109685 | A1 | * | 10/2019 | ............ F16L 41/088 |
|---|---|---|---|---|---|
| EP | 0224188 | A1 | * | 6/1987 | ............ F16L 17/025 |
| EP | 3078891 | A2 | * | 10/2016 | ................ F16L 5/10 |
| EP | 3623675 | A1 | * | 3/2020 | ................ F16L 5/10 |
| EP | 3690298 | A1 | * | 8/2020 | ............ F16L 17/025 |
| FI | 57013 | B | * | 1/1980 | ................ F16L 5/10 |
| KR | 200379768 | Y1 | * | 3/2005 | ................ F16L 5/10 |
| KR | 100944383 | B1 | * | 2/2010 | ............ F16L 17/025 |
| KR | 20130053198 | A | * | 5/2013 | ................ F16L 5/10 |
| NL | 136809 | B | * | 8/1977 | ............ F16L 17/025 |
| NL | 1010333 | C2 | * | 4/2000 | ............ F16L 17/025 |
| WO | WO-0060017 | A2 | * | 10/2000 | ................ F16L 5/10 |
| WO | WO-2012124203 | A1 | * | 9/2012 | ................ F16L 5/10 |

* cited by examiner

CONNECTING DEVICE FOR A SEALED EXCHANGE OF FLUID BETWEEN TWO COMPONENTS, CONNECTING SYSTEM AND BRAKE SYSTEM

CROSS-REFERENCE TO RELATED APPLICATION

This application claims priority to German Priority Application No. 102021127568.7, filed Oct. 22, 2021, the disclosure of which is incorporated herein by reference in its entirety.

TECHNICAL FIELD

The disclosure relates to a connecting device for a sealed exchange of fluid, such as brake fluid, between two components, for example components of a brake system for a motor vehicle, comprising a pipe portion with at least two pipe portion ends. The disclosure also relates to a connecting system having a connecting device, and to a brake system having fluid-conducting components of the brake system, which form a connecting system with a connecting device.

BACKGROUND

Devices for the sealed connection of components are used in a variety of sectors and serve for conducting liquids or gases. It is classically the case that two components for connection must be prepared by machining, for example by way of cutting processes. Here, a groove is formed in the vicinity of the bore, into which groove a sealing element, for example a round sealing ring or O-ring, is inserted. The sealing action arises here as a result of an interference fit of the protruding part of the O-ring against the second component.

The formation of the groove and the finish machining of the surfaces are time-consuming and expensive. A further disadvantage is that the two components must be aligned relative to one another, for which purpose it is for example necessary to introduce an additional sleeve or pin. Furthermore, damage to the O-ring is possible during the assembly process.

DE 600 13 517 T2 has disclosed a device that allows a sealed connection between a rigid pipe and a connecting element in a transfer circuit for liquid. This is achieved by means of a rigid tubular insert part which is surrounded by an elastomer which seals by way of an inner sealing edge against the insert and by way of an outer sealing edge against the components for connection. The prior art has proven successful in principle, but requires an additional process step in the production process for the finish machining of the components.

SUMMARY

What is needed is to overcome the disadvantages of the prior art, for example to specify a device for the sealed connection and easy alignment of two components, with a streamlined flow of the fluid.

According to a first exemplary arrangement of the disclosure, a connecting device for a sealed exchange of fluid between two components is disclosed which comprises a pipe portion with at least two pipe portion ends, wherein an extent of the pipe portion between the pipe portion ends determines a streamline of the fluid, and comprising a sealing element which at least partially surrounds the pipe portion. According to the disclosure, at least one of the pipe portion ends is configured to form an inflow and/or outflow region that extends over the clear dimension of the at least one pipe portion end. A pipe portion is to be understood to mean a hollow body which extends along a fluid transport direction and which has a cylindrical or polygonal cross section.

A streamline is to be understood to mean a geometrical aid for illustratively describing a flow in the field of fluid dynamics. In a steady-state flow, it can be regarded as the path of a small, lightweight particle in the fluid, also known as a particle trajectory.

The inflow and/or outflow region are enlarged in relation to the inner diameter of the pipe portion and extend along the direction of extent of the pipe portion. To form these regions, the pipe portion ends have at least one projection in a pipe circumferential direction along the extent of the pipe portion. The projection is thus connected to the pipe portion ends and at least partially lengthens the pipe portion, wherein the inner and outer diameters of the projection may deviate from those of the pipe portion. Also, the projection follows the circumferential direction of the pipe portion, that is to say, at least in certain portions, encompasses the delimiting line of the surface of the pipe portion. In other words, the pipe circumference describes the length of the line that delimits the pipe portion or the cross section thereof. The projection may be formed out of the pipe portion for example by cutting methods, such as milling, or is already integrally cast during the production process, for example by injection moulding.

On at least one of the pipe portion ends, there are situated two projections which extend away from the pipe portion end and which are spaced apart from one another in a pipe circumferential direction and between which the extended inflow and/or outflow region is at least partially formed. At least one of the pipe portion ends is in this case may be of a crown-shaped form.

The space within the at least one projection is occupied by the fluid and is described as an inflow and/or outflow region of the connecting device. In this region, the fluid collects before/after it has passed the pipe portion ends. The at least one projection serves as a stop with respect to the components for connection. In this way, it is ensured that there is a spacing between the pipe portion end and a portion, which is impinged on by flow, of the component, such that fluid can flow into or out of the pipe portion end transversely with respect to the direction of extent of the projection. The streamline of the fluid is thus transverse with respect to the direction of extent of the pipe portion in the region of the inflow and/or outflow regions. In other words, the at least one pipe portion end is shaped such that fluid can flow into the inflow and/or outflow region transversely with respect to the streamline of the pipe portion.

The sealing element that surrounds the pipe portion has a sleeve-shaped main body which is pushed or injection-moulded onto the pipe portion and which has at least one sealing bead which projects, transversely with respect to the direction of longitudinal extent of the sleeve, in a sealing direction. Secure fixing is provided inter alia by the cutouts, into which the sealing element engages, in the pipe portion. This interlocking between the sealing element and pipe portion permits a rotation of the two parts relative to one another is ruled out, and it is made more difficult for the pressurized fluid to ingress between the two parts. Furthermore, transversely with respect to the direction of longitudinal extent of the sleeve, in a sealing direction, the outer side of the sealing element has projecting, corrugated sealing beads. Said sealing beads impart a sealing action between the connecting device and the two components for connection, wherein the outer diameter of the sealing beads may be somewhat smaller than the corresponding blind bore in the components, into which the connecting device is intended to be fitted. In this way, an interference fit is generated, which compresses the sealing element and intensifies the sealing action. The number of corrugated sealing beads may in this case be optimized for the expected operating conditions, and may be based for example on the expected maximum operating pressure and temperature or the maximum admissible leakage.

The sealing element, on its side facing towards the pipe portion, fills a cutout of the pipe portion and surrounds the positioning projection. In any case, the sealing element extends at least partially over the connecting device and also surrounds the positioning projection of the pipe portion. The material thickness of the sealing element may vary in the direction of longitudinal extent. In one exemplary arrangement, the material thickness of the sealing element over the positioning projection may deviate from other locations in order that the positioning function can be better implemented and is not excessively dampened by the sealing element.

Furthermore, the at least two sealing beads may have different outer diameters, such that components with different blind bore diameters can also be connected. The advantage includes that the dimensions of the pipe portion can remain unchanged, and only the sealing element is adapted to the corresponding blind bore. In this way, production time and costs can be saved.

The material of which the sealing element together with the sealing beads is composed is less rigid than the pipe portion, and may be produced for example from an elastomer or some other material with good elasticity and sealing characteristics. At any rate, a certain deformation of the sealing element the sealing beads is necessary in order that an intense sealing action is generated with respect to the components.

The pipe portion, which may include the pipe portion ends are mirror-symmetrical with respect to a plane that runs perpendicular to the direction of extent of the pipe portion. It is achieved in this way that the assembly process can be performed with no directional dependency, that is to say the connecting device has the same characteristics irrespective of its installation direction. A rotated installation direction also changes the throughflow direction, as a result of which the inflow and/or outflow region are also interchanged. Owing to the mirror-symmetrical construction of the connecting device, this however has no influence on function.

The pipe portion and/or the sealing element have at least one recess, and the respective other of the pipe portion and/or the sealing element has, on a side facing towards the respective first of the pipe portion and/or sealing element, at least one positioning projection which is configured to correspond in terms of shape to the at least one recess and which is in engagement with the recess and which engages in positively locking and/or cohesive fashion into the recess. In one exemplary arrangement, the pipe portion is insert-moulded in the sealing element. For example, the positioning recess is of complementary shape with respect to the positioning projection.

The connecting device according to the disclosure is used where a sealed connection must be ensured for the transfer or conveyance of pressurized liquids and gases. In one exemplary arrangement, the disclosure is used in the automotive sector to ensure sealed connections between components in motor vehicle brakes and in oil and water circuits.

According to a further aspect of the disclosure, a connecting system comprises two components for conducting a fluid, wherein—for the purposes of conducting fluid from one of the two components through a connecting device, into the other of the two components—the two components can be assembled on one another by the connecting device. A positioning projection is formed on the pipe portion of the connecting device, and in each case one partial positioning recess is formed on the two components, such that, in the assembled state, the positioning projection engages into a positioning recess formed by the partial positioning recesses.

The pipe portion advantageously has a positioning projection which extends radially away from the pipe portion and which engages into a two-part cutout that is situated in the two components. By this positioning projection, it is possible, during the assembly process, for the connecting device to be placed and oriented in a functionally appropriate manner. In addition to the axial fixing by the projections, spatially fixed placement can be ensured by the positioning projection. For example, tilting both during the assembly process and during later operation is prevented in an effective manner by the positioning projection. The cutout that is to be formed into the components for this purpose, also referred to as bevel or assembly bevel, generally requires no additional working step during the production process. After the blind bore has been manufactured, it is common for the burr on the surface to be removed, for example by a so-called countersink. This bevel may be formed to be larger than that required for the deburring process, and the positioning projection can thus engage into this bevel. Furthermore, the cutout that is formed into the components facilitates the assembly process, because the components do not need to be guided as precisely for the connection process; the cutout allows a certain tolerance during the assembly process.

The connecting system may further include having the positioning projection, and in each case, one partial positioning recess configured such that the connecting device abuts axially against a respective one of the two components and the two components abut axially against one another. A displacement of the connecting device in an axial direction is hereby ruled out, and exact positioning in the blind bores is ensured. For example, when the connecting device is charged with pressurized fluid, no disruption arises as a result of a movement of the device.

The disclosure also relates to a brake system for a motor vehicle. The brake system comprises two components for conducting brake fluid. The two components are connected to a connecting device according to the disclosure for conducting the brake fluid in sealed fashion from one component into the other. In one exemplary arrangement, the two components and the connecting device are part of a connecting system according to the disclosure.

Advantageous exemplary arrangements and refinements of the disclosure will emerge from the subclaims and from the description considered in conjunction with the figures.

BRIEF DESCRIPTION OF DRAWINGS

Further features, advantages and characteristics of the disclosure will be discussed on the basis of the description of exemplary arrangements of the disclosure with reference to the figures, in which.

DETAILED DESCRIPTION

Figure 1:
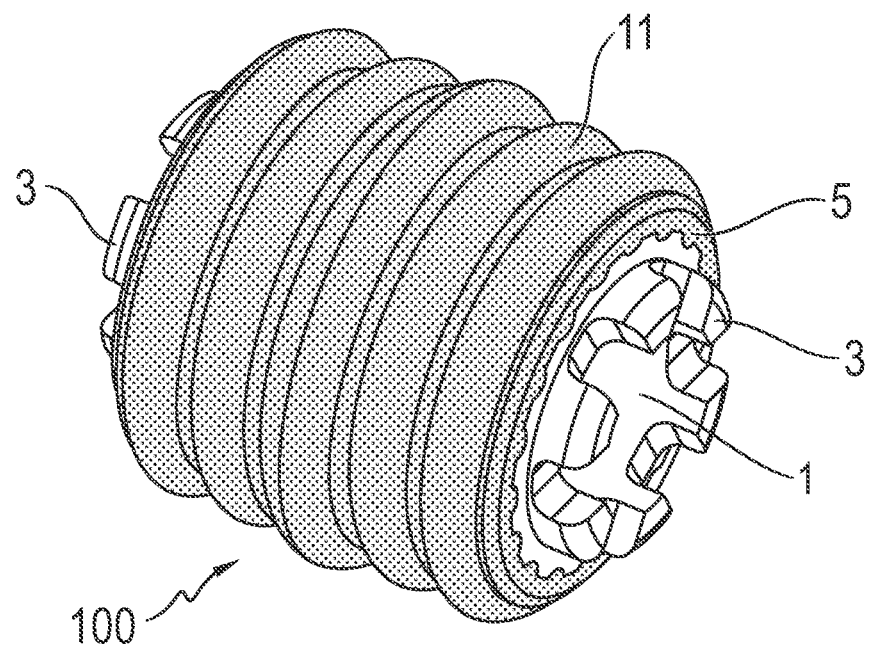
FIG. 1 shows an exemplary arrangement of a connecting device according to the disclosure in a perspective view.

In the figures of the drawing, identical and functionally identical elements and features are denoted by the same reference designations unless stated otherwise.

FIG. 1 illustrates a connecting device according to the disclosure, which comprises a pipe portion 1 and a sealing element 5. As can also be seen in FIG. 2, the pipe portion 1 has a substantially hollow cylindrical shape. In one exemplary arrangement, the pipe portion is an injection-moulded part composed of plastic.

The pipe portion 1 has two pipe portion ends which are situated opposite one another in relation to the direction of longitudinal extent of the hollow cylinder. The sealing element 5 likewise has a hollow cylindrical basic shape and surrounds the pipe portion 1 in the manner of a sleeve. The sealing element 5 surrounds the pipe portion 1 from one pipe portion end along the entire longitudinal extent of the pipe portion to the other pipe portion end. The outer side, averted from the pipe portion 1, of the sealing element 5 comprises multiple sealing beads 11 that may be distributed uniformly along the longitudinal extent of the sealing element. The sealing beads 11 extend, in one exemplary arrangement, in an uninterrupted fashion, along the entire circumference of the hollow cylindrical main body. The sealing action is imparted by at least two encircling sealing beads 11 that make contact with the components 7, 7a, that is to say constitute a barrier for the fluid.

Through variation of the diameter of the encircling sealing beads 11 and of the sealing element 5, it is furthermore possible for the same pipe portion 1 to be utilized for different applications or installation situations. An adaptation of the connecting device is then realized through a variation of the diameter of the sealing element 5. A multiplicity of encircling sealing beads 11 and associated surface pairs furthermore increases the leak-tightness of the connecting device 100. The sealing element 5 is distinguished by the fact that the pipe portion 1 is more rigid than the at least partially surrounding sealing element 5.

Figure 2:
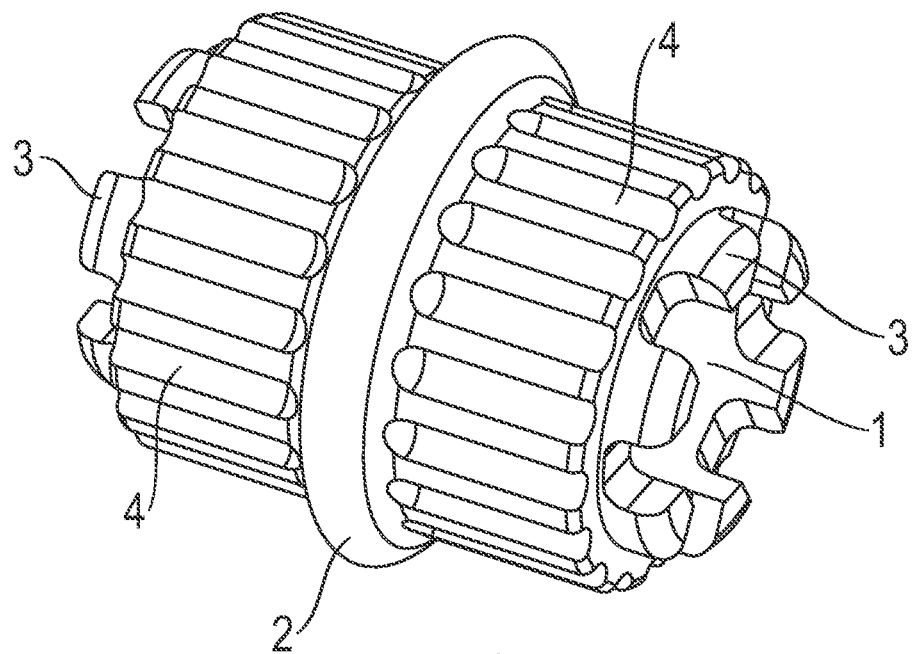
FIG. 2 shows the connecting device as per FIG. 1 in a perspective view, with the sealing element having been removed.

As can be seen from FIG. 1, the construction of the connecting device 100 is symmetrical with respect to a plane perpendicular to an axis of rotation of the cylindrical portion. In this way, there is no directional dependency for the assembly of the connecting device 100 into the two components 7, 7a, FIG. 2 shows the connecting device 100 from FIG. 1, but without the sealing element 5 with the sealing beads 11. The positioning projection 2 is situated centrally on an outer wall of the pipe portion 1, runs at least partially in encircling fashion, and is advantageously created during the production of the pipe portion 1. The course of the elevation of the positioning projection 2 as shown in FIG. 2 is merely exemplary, and the elevation may be larger or smaller, and the gradient with which the projection 2 rises may also differ from the version shown. The pipe portion has additional cutouts 4 in front of and behind the positioning projection 2, whereby the surface area between pipe portion 1 and sealing element 5 is enlarged, and an improved connection is ensured. The sealing element 5 engages into these cutouts 4 and, by way of the enlarged contact area, produces an improved force flow between pipe portion 1 and sealing element 5.

Figure 3:
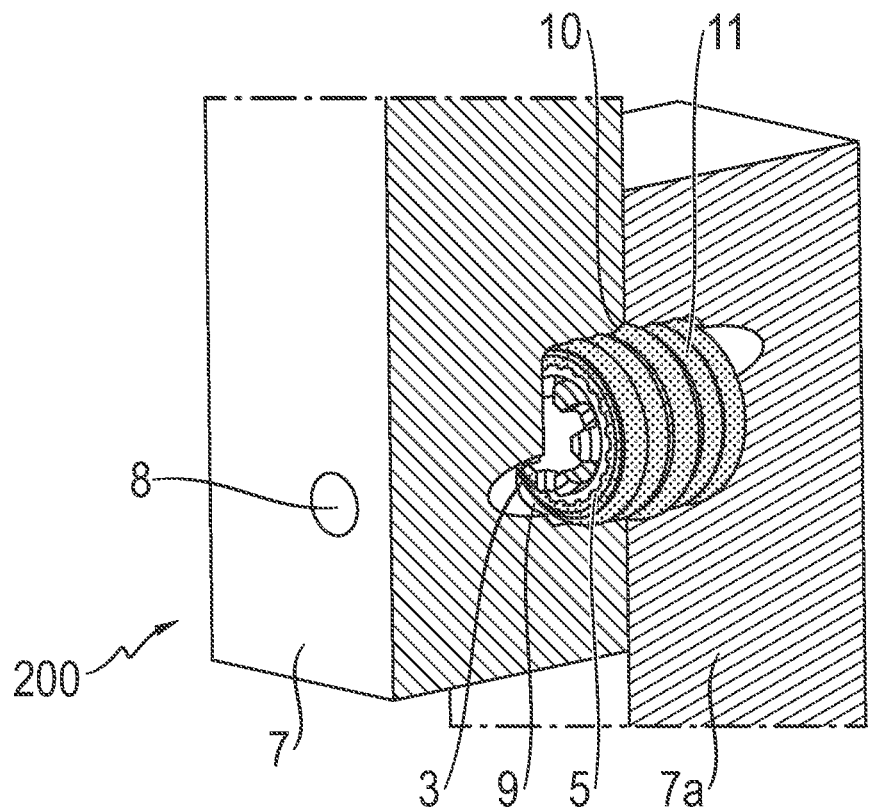
FIG. 3 shows a first exemplary arrangement of a connecting system according to the disclosure.

FIG. 3 shows a connecting system 200 composed of a first component 7, a second component 7a and a connecting device 100. The connecting device 100 has a pipe portion 1 and a projection 3, which are situated between a first component 7 and a second component 7a in order to connect the components to one another in leakage-free fashion for the exchange of fluid. For this purpose, the first component 7 has a fluid connector 8 that opens into an inflow region 9 directly upstream of the pipe portion 1. The fluid connector 8 serves for connecting the at least one component 7, 7a to other components and devices which are not illustrated. This may, for example, be a hose for conducting fluid, which hose is connected to the fluid connector 8 by a thread. It is also possible for some other device to be screwed to the component 7, 7a and for the fluidic connection to be generated by a corresponding bore in the other device. The second component 7a likewise has a fluid connector (not illustrated) that opens into an outflow region 9a directly upstream of the pipe portion 1. The inflow and/or outflow regions 9, 9a, comprise the volume that is formed within the at least one projection 3, wherein this does not include the volume that is formed by the pipe portion 1. Owing to the formation of an inflow and/or outflow region 9, 9a, the direction from which the fluid flows into or out of the fluid connectors 8 is not of importance. In one exemplary arrangement, and inflow and outflow direction transverse with respect to the direction of extent of the pipe portion 1 is made possible by the inflow and/or outflow regions 9, 9a.

The projection 3, which is situated on the at least two pipe portion ends of the pipe section 1, projects away from the respective pipe portion end in the direction of the streamline in a circumferential direction. For this purpose, use may be made of a streamline at the pipe portion end; optionally also the streamline at another location of the connecting device 100. The projection 3 extends in the circumferential direction of the pipe portion end only along a part of the circumference. A free region is thus formed along the remaining circumference of the pipe portion end, through which free region fluid can flow into and/or out of the pipe portion end.

Such an arrangement allows fluid to flow into the pipe portion 1 from different directions. In other words, the orientation of the inflow into the inflow and/or outflow regions 9, 9a is independent of the orientation of the connecting device 100. According to the disclosure, the fluid can flow into and out of the fluid chamber 9, 9a from different directions.

The positioning recess 10 in the components 7, 7a, as can be seen in FIG. 3, is made up of two partial positioning recesses that are situated in each case in one of the components 7, 7a. As a result of the connection of the two components 7, 7a during the assembly process, the positioning recess 10 is formed from the partial positioning recesses and serves for receiving the positioning projection 2 in order to exactly spatially fix the connecting device 100 with respect to the components.

An axial stop, that is to say an arrangement for limiting the displacement in a longitudinal direction, for the pipe portion 1 is realized by a force fit between the projections 3 and the components 7, 7a. Furthermore, the positioning of the connecting device 100 is realized by a positioning projection 2 on the pipe portion 1, which positioning projection engages into a corresponding positioning recess 10 that is formed by the two components 7, 7a.

Figure 4:
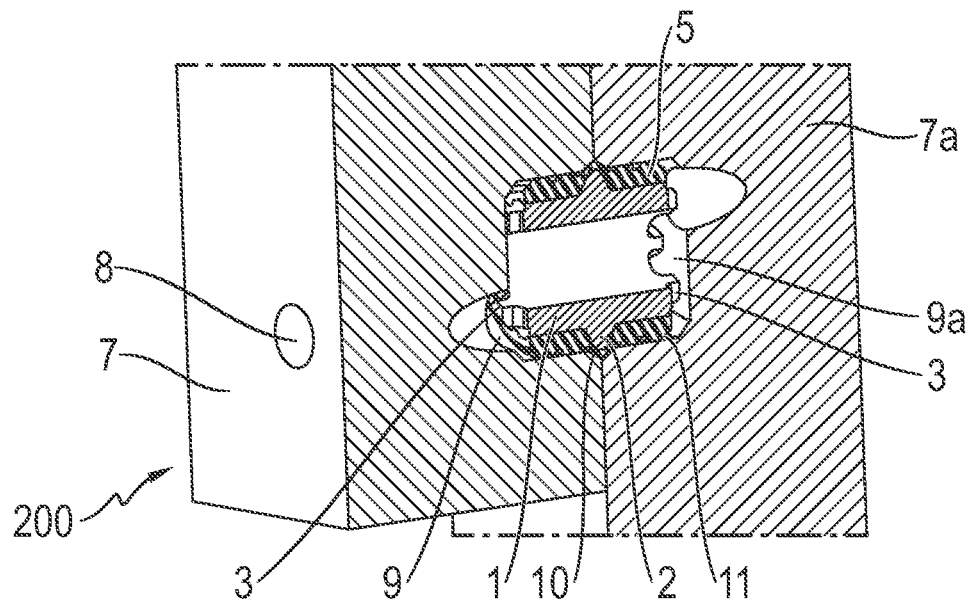
FIG. 4 shows the connecting system as per FIG. 3 in a sectional illustration.

FIG. 4 shows the same components as FIG. 3, but in this case the connecting device is shown in a section along the direction of extent of the pipe. For the exchange of fluid between the components 7, 7a, the fluid passes through the fluid connector 8 into the first component 7, from where it passes through a channel into the inflow region 9. The connection between fluid connector 8 and inflow region 9 may in this case run transversely with respect to the direction of extent of the pipe portion 1. In one exemplary arrangement, the fluid may flow transversely into the inflow region 9. The fluid flows around the at least one projection 3 that defines the inflow region. After the fluid has passed the pipe portion 1, it passes into the outflow region 9a, which is in turn formed by at least one projection 3. Owing to the mirror-symmetrical construction of the connecting device, the pipe portion 1 together with the sealing element 5 and the projection 3 can also be inserted having been rotated through 180° about the vertical axis. The function remains unaffected in this case. From the outflow region 9a, the fluid passes to a fluid connector (not illustrated) in the second component 7a. Here, too, the outflow of fluid from the outflow region 9a may run transversely with respect to the direction of extent of the pipe portion 1. The flows through the connecting device 100 may also run counter to the direction described above.

The pressurized fluid also impinges, at the inflow and/or outflow regions 9, 9a, on the sealing element 5 and the sealing beads 11 thereof. Owing to the interference fit between the sealing beads 11 and the components 7, 7a, however, no fluid passes into the intermediate gap, whereby a sealed connection is created between the components 7, 7a.

In the sectional illustration in FIG. 4, it is likewise possible to clearly see how a sealing bead 11 of the sealing element 5 is pushed by the positioning projection 2 into a corresponding recess 10. The recess in the two components 7, 7a allows easy positioning of the connecting device 100 and ensures that tilting of the connecting device 100 is avoided. Furthermore, the assembly process is simplified by the recess 10, because the two components 7, 7a do not need to be exactly aligned with one another for the assembling process. Owing to the mirror-symmetrical construction, the positioning projection 2 is furthermore situated exactly in the transition region between the components 7, 7a irrespective of the installation direction.

If necessary, isolated features may also be picked out from the combinations of features disclosed here and used, with the elimination of any structural and/or functional relationship that exists between the features, in combination with other features for the purposes of delimiting the claimed subject matter. The sequence and/or number of steps of the methods may be varied. The methods may be combined with one another, for example to form one overall method.

The invention claimed is:

1. A connecting device for a sealed exchange of fluid between two components, comprising:
  a pipe portion with at least two pipe portion ends, the pipe portion including at least one positioning projection which extends radially away from the pipe portion,
  wherein an extent of the pipe portion between the at least two pipe portion ends determines a streamline of the fluid, and
  a sealing element which at least partially surrounds the pipe portion,
  wherein the sealing element has at least one recess that faces towards the pipe portion, and wherein the at least one positioning projection has a shape that is configured to correspond to the at least one recess and which engages with the at least one recess in a positively locking fashion into the at least one recess, and
  wherein at least one of the pipe portion ends is configured to form an inflow and/or outflow region that extends over at least a portion of the at least one pipe portion end,
  wherein the pipe portion is more rigid then the at least partially surrounding sealing element; and
  wherein at least one of the pipe portion ends is configured with at least a pair of projections, which are spaced apart from one another in a pipe circumferential direction and between which the extended inflow and/or outflow region is at least partially formed.

2. The connecting device according to claim 1, wherein at least one of the pipe portion ends is of crown-shaped form having a plurality of the projections, along part of the circumference, thereby forming free regions between each adjacent projections.

3. The connecting device according to claim 1, wherein the sealing element has a sleeve-shaped main body which has at least one sealing bead which projects, transversely with respect to a direction of longitudinal extent of the sleeve-shaped main body, in a sealing direction.

4. The connecting device according to claim 1, wherein wherein the pipe portion is insert-molded in the sealing element.

5. The connecting device according to claim 1, wherein the sealing element comprises at least two sealing beads with different outer diameters.

6. The connecting device according to claim 1, wherein the sealing element, on a side facing towards the pipe portion, fills a cutout of the pipe portion and surrounds the at least one positioning projection.

7. The connecting device according to claim 1, wherein the at least one pipe portion end is shaped such that fluid flows into the inflow and/or outflow region transversely with respect to the streamline of the pipe portion.

8. The connecting device according to claim 1, wherein, on at least one of the pipe portion ends, two projections are formed which extend away from the pipe portion end and which are spaced apart from one another in a pipe circumferential direction and between which the extended inflow and/or outflow region is at least partially formed.

9. A connecting system, comprising:
  two components for conducting a fluid and comprising a connecting device that comprises:
  a pipe portion with at least two pipe portion ends, the pipe portion including at least one positioning projection which extends radially away from the pipe portion,
  wherein an extent of the pine portion between the at least two pipe portion ends determines a streamline of the fluid, and
  a sealing element which at least partially surrounds the pipe portion,
  wherein the sealing element has at least one recess that faces towards the pipe portion, and wherein the at least one positioning projection has a shape that is configured to correspond to the at least one recess and which engages with the at least one recess in a positively locking fashion into the at least one recess, and wherein at least one of the pipe portion ends is configured to form an inflow and/or outflow region that extends over at least a portion of the at least one pipe portion end, and wherein at least one of the pipe portion ends is configured with at least a pair of projections, which are spaced apart from one another in a pipe circumferential direction and between which the extended inflow and/or outflow region is at least partially formed, wherein, for the purposes of conducting fluid from one of the two components through the connecting device into the other of the two components, the two components being assembled on one another by the connecting device, wherein:

in each case one partial positioning recess is formed on each of the two components, such that, in an assembled state, the at least one positioning projection of the pipe portion engages into a positioning recess formed by the partial positioning recesses.

10. The connecting system according to claim 9, wherein the positioning recess is of complementary shape with respect to the at least one positioning projection.

11. The connecting system according to claim 9, wherein the at least one positioning projection and the in each case one partial positioning recess are configured such that the two components can be assembled so as to lie against one another by way of a respective contact side.

12. The connecting system according to claim 9, wherein the at least one positioning projection and in each case, the one partial positioning recess are configured such that the connecting device abuts axially against a respective one of the two components and the two components abut axially against one another.

13. The connecting system according to claim 9, wherein the sealing element imparts a sealing action with respect to the two components and the pipe portion.

14. A brake system for a motor vehicle, comprising: two components for conducting brake fluid, wherein the components are connected to one another, for a sealed exchange, by a connecting device comprising:
a pipe portion with at least two pipe portion ends, the pipe portion including at least one positioning projection which extends radially away from the pipe portion,
wherein an extent of the pipe portion between the at least two pipe portion ends determines a streamline of the fluid, and
a sealing element which at least partially surrounds the pipe portion,
wherein the sealing element has at least one recess that faces towards the pipe portion, and wherein the at least one positioning projection has a shape that is configured to correspond to the at least one recess and which engages with the at least one recess in a positively locking fashion into the at least one recess, and wherein at least one of the pipe portion ends is configured with at least a pair of and/or outflow region that extends over at least a portion of the at least one pipe portion end, and wherein at least one of the pine portion ends is configured with at least a air of projections, which are spaced apart from one another in a pipe circumferential direction and between which the extended inflow and/or outflow region is at least partially formed, wherein, the two components and the connecting device are part of a connecting system, and in each case one partial positioning recess is formed on each of the two components, such that, in an assembled state, the at least one positioning projection engages into a positioning recess formed by the partial positioning recesses.

15. A connecting device for a sealed exchange of fluid between two components, comprising:
a pipe portion with at least two pipe portion ends, the pipe portion including at least one positioning projection which extends radially away from the pipe portion,
wherein an extent of the pipe portion between the at least two pipe portion ends determines a streamline of the fluid, and
a sealing element which at least partially surrounds the pipe portion,
wherein the sealing element has at least one recess that faces towards the pipe portion, and wherein the at least one positioning projection has a shape that is configured to correspond to the at least one recess and which engages with the at least one recess in a positively locking fashion into the at least one recess, and
wherein at least one of the pipe portion ends is configured to form an inflow and/or outflow region that extends over at least a portion of the at least one pipe portion end, and
wherein at least one of the pipe portion ends is configured with at least a pair of projections, which are spaced apart from one another in a pipe circumferential direction and between which the extended inflow and/or outflow region is at least partially formed
wherein the connecting device and/or the two pipe portion ends of the pipe portion is/are configured mirror-symmetrically with respect to a plane that runs perpendicular to a direction of the extent of the pipe portion.

* * * * *